April 27, 1965
T. C. GERNER
3,180,655
IDLER ARM CONSTRUCTION
Filed June 25, 1962
3 Sheets-Sheet 1
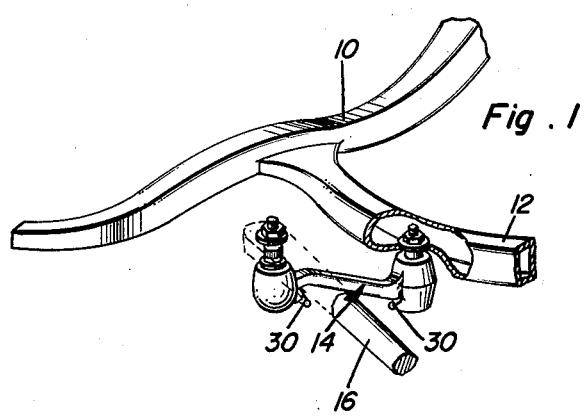
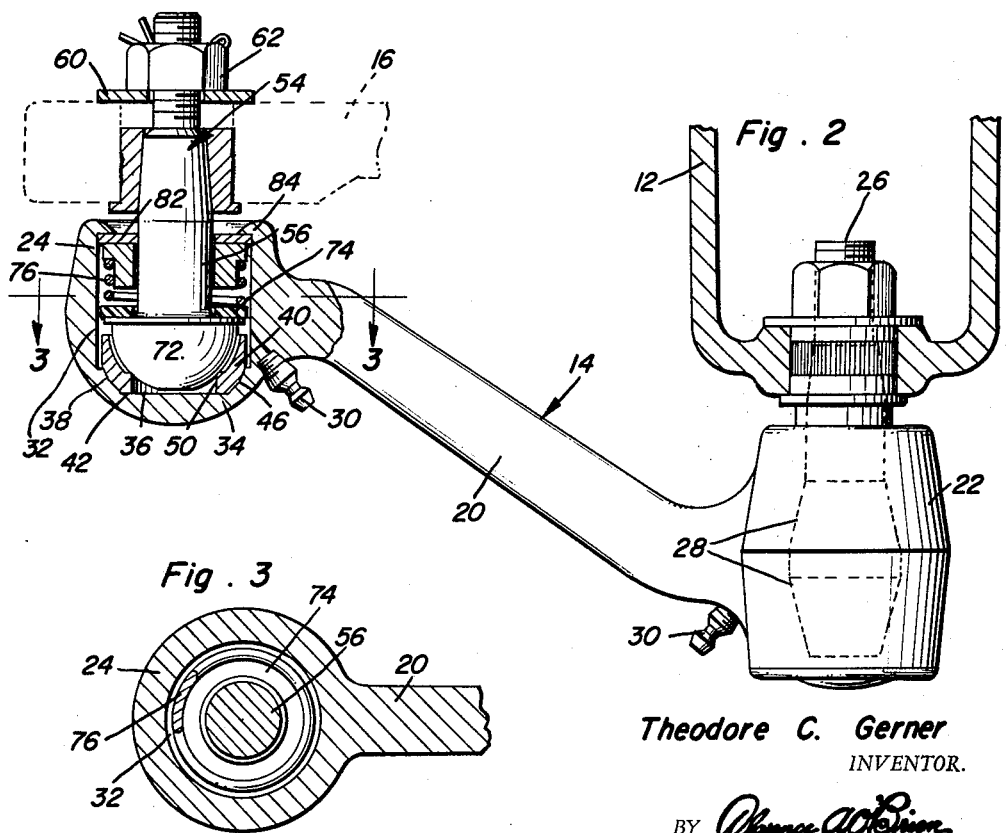
Theodore C. Gerner
INVENTOR.

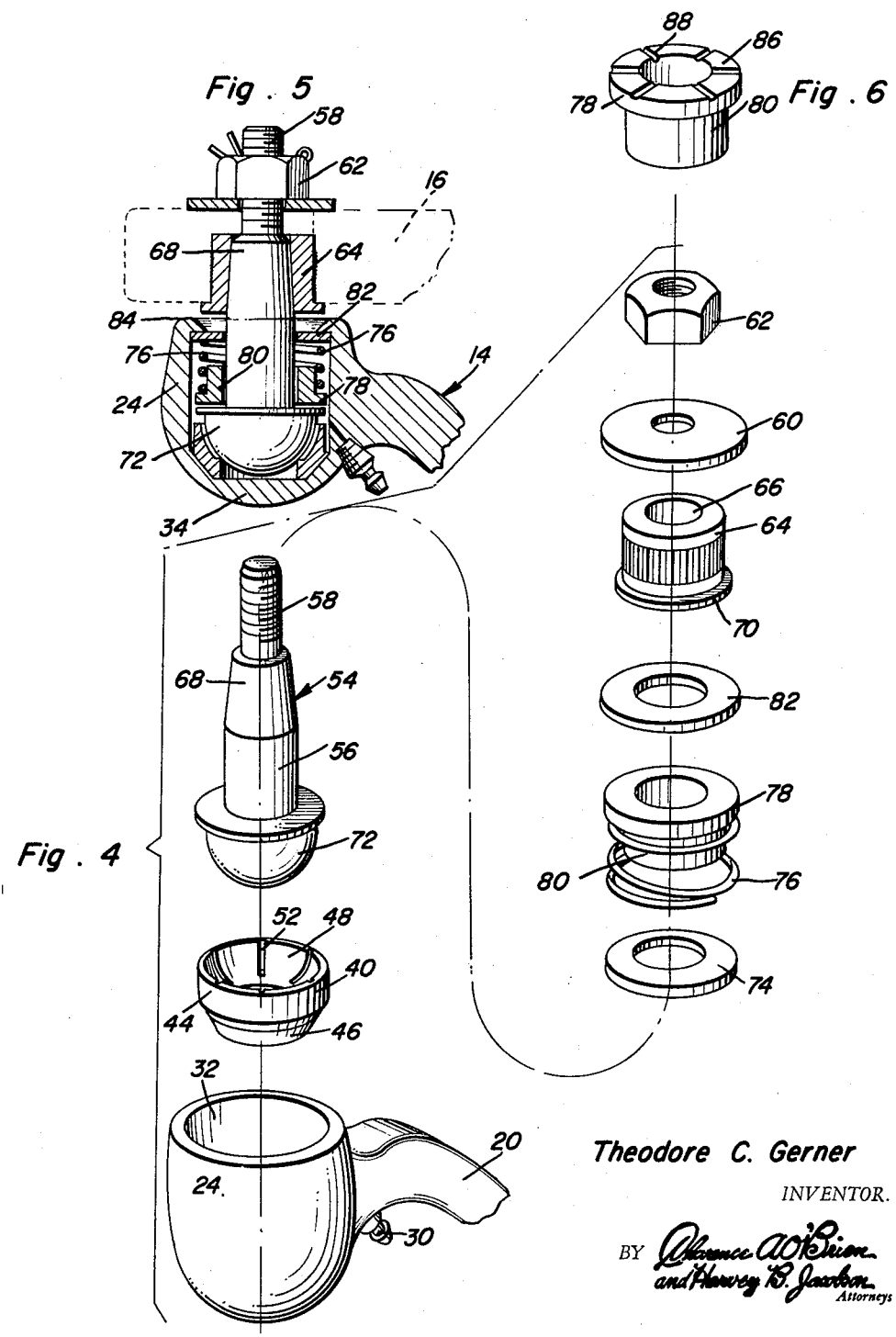

April 27, 1965 T. C. GERNER 3,180,655
IDLER ARM CONSTRUCTION
Filed June 25, 1962 3 Sheets-Sheet 3
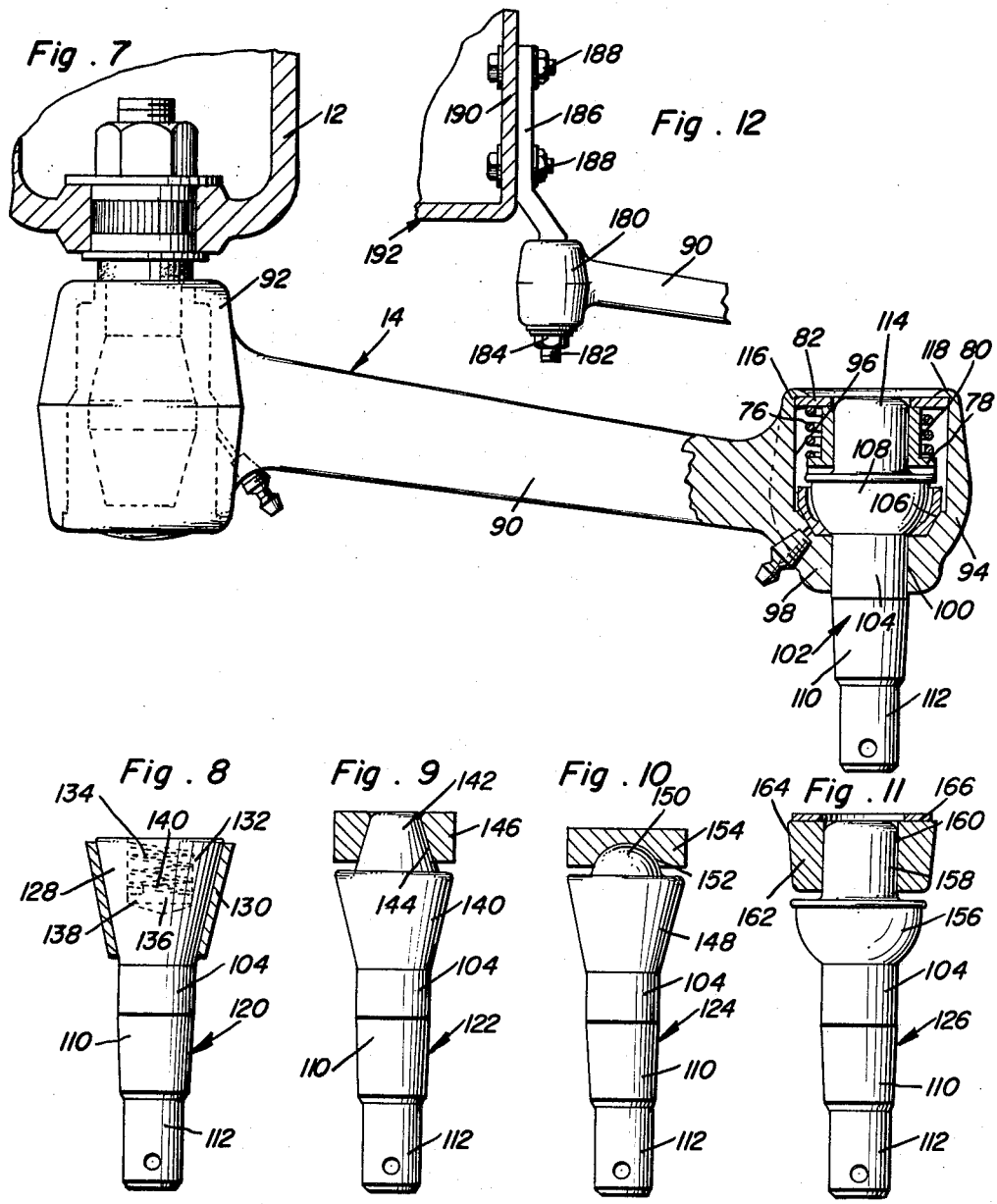
Theodore C. Gerner
INVENTOR.

3,180,655
IDLER ARM CONSTRUCTION
Theodore C. Gerner, P.O. Box 4305,
Oklahoma City, Okla.
Filed June 25, 1962, Ser. No. 204,795
11 Claims. (Cl. 280—95)

This invention comprises a novel and useful idler arm construction and more particularly pertains to a wear takeup replacement assembly specifically adapted for use with the idler arms forming a part of the steering linkage of automotive vehicles.

This invention relates generally to subject matter which is similar to that set forth in my prior Patent No. 2,997,350 for Self-Adjusting Threaded Bushing With Locking Pin and my prior Patent No. 2,973,208 for Self-Adjusting Threaded Bushing With Locking Bar, and further constitutes an improvement over my prior copending application Serial No. 797,645, filed March 6, 1959, for Replacement Unit for Idler Arm Bracket, now Patent No. 3,044,798 of July 17, 1962.

The primary object of this invention is to provide a repair unit including a replacement idler arm together with automatic self-compensating wear takeup swivelling connections for the opposite ends of said idler arm.

A still further object of the invention is to provide a replacement assembly which may be quickly and easily applied by unskilled or semi-skilled labor and which will effectively remove any wear and lost motion in the swivelling connection at the opposite ends of the idler arm.

More specifically, it is an important object of this invention to provide a self-adjusting, wear compensating swivelling connection for securing an idler arm to its mounting upon the frame cross member of a motor vehicle and to a portion of a steering linkage to which the idler arm is connected.

A further and more specific object of the invention is to provide a self-adjusting, automatically compensating, wear takeup pivotal connection for an idler arm wherein complementary swivelling surfaces are provided upon a male pin received in a female box in the idler arm and whereby the complementary swivelling surfaces are resiliently urged into contact with each other for taking up wear.

Still another object of the invention is to provide a wear takeup construction for idler arms which shall be particularly adapted for fabrication from powdered metal and a lubricant material.

A further specific object of the invention is to provide an automatic wear compensating idler arm construction specifically adapted for replacements in conventional present-day automotive steering linkage systems.

A still further important specific object of the invention is to provide an idler arm construction which will completely eliminate the necessity for a precision location and finish of the idler arm socket for the reception of the joint ball member therein together with a ball seat insert having a precision engagement with the idler arm socket and with the joint ball member thereby materially reducing the cost of the idler arm.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a portion of the chassis or frame of a vehicle and showing applied thereto one form of replacement idler arm unit in accordance with this invention, the unit illustrated being the type particularly adapted for use in the well known Ford steering mechanism;

FIGURE 2 is a view upon an enlarged scale partly in vertical elevation and partly in vertical section of the unit of FIGURE 1 and showing in particular the swivelling connection at the idler arm relay end;

FIGURE 3 is a detailed view in horizontal section taken substantially upon the plane indicated by section line 3—3 of FIGURE 2;

FIGURE 4 is a group perspective view of the various elements forming the idler arm relay end connection;

FIGURE 5 is a fragmentary view similar to FIGURE 2 but showing a modified arrangement employing a reversal of certain parts of the swivelling connection;

FIGURE 6 is a perspective view of an element of the modifications of FIGURES 1–5;

FIGURE 7 is a view similar to FIGURE 2 but showing a modified construction of idler arm particularly adapted for use with the steering linkage system of the Chevrolet car;

FIGURES 8–11 are detailed views of modified forms of relay pins which may be utilized in certain specific applications of the principles of this invention to automotive steering linkage systems; and FIGURE 12 is a detail view of a slightly modified anchor pivot for the relay arm.

Owing to the vibrations and different motions to which the joints at the two ends of the idler arm of present-day steering systems of motive vehicles are subjected during operation of the vehicle, the two pivotal connections at the opposite ends of the idler arm are subjected to excessive wear and vibration which soon destroy the precision fit originally provided for these parts and introduce lost motion and wear thereinto. When this condition occurs, there arises sufficient play in the steering linkage of the vehicle to render the operation of the same dangerous and hazardous. Consequently, it has become necessary and conventional practice to correct this condition from time to time when such play and wear develops to an excessive extent.

It is the primary intent of this invention to provide a replacement construction for the idler arm and its two pivotal connections referred to hereinafter as the relay end and the anchor end of the idler arm and which replacement construction will automatically compensate for wear as the same develops and thus eliminate substantially all detrimental play in the pivotal connections of the idler arm and will thus obviate the necessity for frequent repairs as well as maintaining the steering mechanism in a safe and dependable condition of operation.

Referring first to FIGURE 1, it will be observed that the numeral 10 indicates a portion of the chassis or frame of a conventional motor vehicle having a cross arm 12 extending therefrom. An idler arm indicated generally by the numeral 14 is mounted upon this cross arm and is connected to a rod 16 which forms a portion of the steering linkage of the vehicle. It is in this particular environment that the improved idler arm constructions set forth and claimed hereinafter are specifically adapted.

The idler arm 14 has its two end portions each provided with a pivotal connection. The pivotal connection of the idler arm to the cross member 12 of the vehicle chassis frame is referred to hereinafter as the anchor end or the anchor connection of the idler arm, while the connection of the idler arm to the link 16 is referred to as the relay end or relay connection of the idler arm.

Throughout the drawings and specification, the idler arm is referred to in general by the numeral 14. As is well understood by those skilled in this art, however, the idler arms are necessarily of different specific shapes and dimensions in accordance with the fixed requirements of the particular steering linkage system with which the replacement idler arm is to be used.

Reference is now made first to FIGURES 2–5 which disclose constructions of idler arms which are designed to meet the specific requirements of and are specifically intended to function effectively as the replacements for the idler arms of conventional Ford steering linkages. The idler arm 14 intended for use in these particular steering linkages includes an elongated body 20 having hollow vertically extending enlargements 22 and 24 respectively at its anchor and relay ends. Each of these enlarged ends is hollow having a vertically extending bore therein. Connecting means comprising pivotal connections are secured in these bores and provide the means by which the idler arm 20 is connected to the vehicle chassis frame member 12 and to the steering linkage member 16. In various types of automotive vehicle, due to the differences in dimensions, vertical clearances, the geometry of motion of the linkage and the like, the lengths of the idler arms and the angular disposition of the anchor and relay ends thereof are critical and relatively fixed. It will therefore be appreciated that the idler arm constructions intended for different steering linkage systems will of course have different lengths and proportions designed for the specific system in which they are to be used.

The pivotal connection at the anchor end of the idler arm in each of the forms of the invention set forth herein is preferably of the construction set forth in my above identified Patent No. 3,044,798, consisting of an anchor pin 26 having reversely conical surfaces 28 thereon for engagement with corresponding reverse conical seats in the anchor end 22 whereby the idler arm is horizontally swingable about the vertical axis through the anchor pin 26. It is the construction of the relay end pivotal connection which forms the subject matter of the invention disclosed and claimed in connection with the various modifications set forth in this application.

As will be noted from FIGURE 1, both the anchor and relay ends of the idler arm 14 are provided with lubricant pressure fittings 30 whereby lubricant as needed may be supplied to the vertical bores in these ends to maintain proper lubrication of the pivotal connections retained therein.

In the arrangement illustrated in FIGURES 2 and 4, the relay end 24 of the idler arm has a vertically extending bore 32 therein which is provided with a closed bottom wall 34, this bore having an open top. Adjacent its lower end, the bore 32 has a flat bottom wall 36 which merges with the side wall of the bore by a frustoconical tapered or a spherical surface 38. Received in this bore and insertable thereinto from the open top thereof is a ball seat member 40 in the form of a ring. This seat member includes a flat plane bottom surface 42 together with a cylindrical side surface 44 of lesser diameter than that of the bore 32 together with a positioning surface 46 which connects the side surface with the bottom surface. This positioning surface is complementary to that of the surface 38 of the bore 32 and operates to properly position and locate the ball seating member 40 in the bore. By means of this construction, the bore can be roughly cast without the necessity for extreme precision, and the surface 38 may then be accurately fabricated, thus providing a relatively inexpensive construction to effect proper seating of the member 40 in the bore.

As will be best apparent from FIGURE 4, the top surface of the member 40 is recessed to provide a spherical ball seat 48 therein and the member 40 further has an opening 50 extending therethrough. The seat 40 is provided with a plurality of preferably radially extending grooves or channels 52 which provide means for supplying lubricant to the engaging surfaces of the pivotal connection as set forth hereinafter.

The pivotal connection at the relay end of the idler arm also includes a relay end pin indicated generally by the numeral 54. This pin includes a cylindrical shank 56 having a diametrically reduced externally threaded extremity 58 for receiving thereon the usual washer 60 and locking nut 62. A bushing 64 is provided with a conical bore 66 therein for reception upon the correspondingly tapered conical surface 68 of the shank 56, the bushing further having a seating flange 70 thereon. The arrangement is such that when partially exposed in the manner shown in FIGURE 2, tightening of the nut 62 will firmly and rigidly secure the shank of the relay end pin into the steering linkage component 16 with the remainder of the relay pin projecting downwardly therefrom.

At its lower end, the shank 56 is provided with a hemispherical ball or head 72 which is swivelly seated in the ball seat 48. Thus, the steering linkage member 16 which is fixedly and rigidly secured to the shank of the relay pin is capable of a pivotiing and swivelling movement with respect to the ball seat of the relay arm.

Loosely and slidably received upon the shank 56 and bearing against the ball head 72 thereof is a washer 74 comprising a spring seat for a compression spring 76. The latter is disposed in the bore 32 and at its other end bears against the laterally enlarged flange 78 of a sleeve or bushing 80 which is slidably received upon the shank, the exterior of this bushing acting as a guide for the spring 76. A further washer 82 constitutes a retaining member or closure for the open top of the bore 32, being retained therein as by an inturned lip 84 which may be peened over upon this closure member. It will thus be apparent that the compression spring resiliently presses against the spring retainer bushing 78, 80 and the washer 74 to thereby yieldingly exert pressure between the idler arm and the ball head of the relay pin to thus yieldingly urge this head against the ball seat in the socket of the relay end of the idler arm.

In some instances, as shown in FIGURE 6, it may be preferred to form the top surface 86 of the enlarged flange 78 with radially extending grooves or channels 88 to facilitate lubrication between this flange and the adjacent element. This arrangement is particularly useful in a modified construction shown in FIGURE 7 to be hereinafter described.

It is also possible to reverse the spring retainer bushing as shown in FIGURE 5. In this form of the invention, the spring 76 has been shown as directly abutting against the closure member 82 at its upper end, and as pressing downwardly against the enlargement 78 of the bushing 80 to thereby urge this enlargement downwardly against the head 72. However, the operation of this form of the invention is identical with that previously described except that with this arrangement of the spring bushing retainer, a somewhat greater spring resistance to swivelling movement is imparted to the connection.

The embodiment shown in FIGURE 7 is particularly adapted for use with steering linkages of the well known Chevrolet automobile type. In this form, the idler arm is similar in construction to that shown in FIGURE 2 in that there is provided an elongated idler arm body member 90 having anchor and relay ends 92 and 94 respectively. The anchor end 92 is identical with the anchor pin end 22 of the preceding form both as to its construction and its mounting upon the vehicle chassis frame cross member 12. There is a slight difference in the construction of the relay end of the anchor arm. Further, the angular disposition of the two enlarged ends of the arm is necessarily different from that of the preceding form in view of the geometrical requirements of the steering linkage to which this replacement arm is specifically adapted. However, the relay end of the arm is provided with a vertically extending bore 96 therein which is open at its top and is provided with a bottom closing wall 98. However, in this instance, the bottom closing wall is provided with an aperture 100 therethrough in order that a relay pin indicated generally at 102 may have its shank 104 seated in this bore and projecting downwardly therefrom. As in the preceding form there is provided a ball seat member 106 whose construction and mounting corresponds to and may be identical with that of the member 40. However, the spherical surface of the ball member 106 on the shank of the relay pin 102 faces in the direction of the shank and seats and rests upon the ball seat of the member 108. There is likewise provided the conical or tapering surface 110 corresponding to the surface 68 previously mentioned. The extremity 112 provides a means which is preferably threaded for attachment of the relay pin to the steering linkage member 16.

In this form of the invention, however, the relay pin has an axially projecting cylindrical portion 114 upon which is slidably received the previously mentioned spring retainer bushing consisting of the sleeve 80 having a diametrically enlarged flange 78 at one extremity, for reception of the spring 76 thereagainst. The closure member 82 previously mentioned is retained in the bore as by being seated in an annular recess or channel 116 and being retained therein as by a lip 118 being turned over thereon. This construction operates in the same manner as that previously described except that the relay pin projects downwardly or is reversed with respect to the relay pin in the preceding form of the invention and the spring means is associated with the other end of the relay end.

FIGURES 8–11 show modified construction of relay pins which are similar in construction to the pin 102. Accordingly, corresponding portions of the relay pins of FIGURES 8–11 have been given the same numerals in order to simplify a comparison of their construction with those of the pin 102. The pins of FIGURES 8–11 are respectively designated in general by the reference numerals 120, 122, 124, and 126. Each includes a shank portion 104 cylindrical in configuration together with the tapered or conical surface 110 and the extremity 112. However, the pivotal connections of these pins is somewhat different. Thus, the pin 120 has its upper extremity provided with a conical seating surface 128 upon which is received a conical bushing 130. The latter is adapted to seat in a correspondingly shaped socket in the relay end of the idler arm so as to produce a wedging action to take up slack therebetween. The tapered portion 128 of this pin is provided with a bore 132 in which is received a compression spring 134 together with a spring seat 136. The latter includes a disk 138 seated at the bottom of the bore together with a diametrically reduced upwardly extending projection 140 constituting a guide to receive thereon the spring 134. In this form of the invention, it may be assumed that this pin is substituted for the pin 102 in the construction of FIGURE 7, except that the elements 78, 80 and 76 are omitted, with the element 82 being retained to constitute an abutment for the end of the spring 134. Alternatively, this pin could be substituted for the relay pin 54 of FIGURE 4 with appropriate changes in the mounting socket in the idler arm.

The idler arm relay pin 122 of FIGURE 9 likewise includes a conical base portion 140 adapted to be directly received in a corresponding seating element in the socket of an idler arm. However, there is provided a reversely conical diametrically reduced extension 142 at the extremity at this form of pin which is received in a corresponding conical seat 144 of a seat member 146.

In the arrangement of FIGURE 10, the end of the pin is provided with a conical extension 148 from which axially projects a hemispherical ball member 150 swivelly received in a corresponding spherical seat 152 in the seat member 154. Finally, in the form 126 of FIGURE 11, the end of the relay pin includes a spherical ball head 156 from which projects a cylindrical extension 158 in the same manner as the corresponding elements shown in FIGURE 7. The extension 158 is received in a cylindrical bore 160 in a seat member 162. However, the latter has its exterior surface of a conical configuration as shown at 164 to provide a wedging action and a corresponding seating surface in the socket of the relay end of the idler arm. A washer 166 cooperates with the seat member 162 to retain the latter in position.

In all of the forms of the invention shown in FIGURES 7–11, the extremities 112 are understood to be capable of being threaded in the same manner as the threaded extremity 58 of the preceding form of relay pin. The chief characteristic of the modification of FIGURES 8–11 is that they tend to reduce the overall height required for the pivotal connection of the relay pin.

FIGURE 12 shows a slightly modified construction as to the pivotal connection at the anchor end of the idler arm of FIGURE 7 which is necessary in order to adapt this arm to the conventional 1961 and 1962 model Chevrolet automobile. The anchor mounting shown in FIGURE 7 is adapted for attachment to the frame cross member of the 1958, 1959 and 1960 models of Chevrolet. However, in the later model Chevrolet, the idler arm is pivotally supported from the vehicle chassis side frame member.

Since the same idler arm construction shown in FIGURE 7 is employed in this particular installation, the arm is indicated by the same reference numeral 90. The enlargement for pivotally mounting the arm anchor end is shown at 180. This enlargement of any suitable construction has a bore therethrough in which is snugly received the depending threaded extremity 182 and nut and washer assembly 184 at the lower rod-like end of the plate-like bracket 186. The latter is secured by fasteners 188 to the vertical side wall 190 of the vehicle chassis side frame channel member 192.

For convenience, the replacement idler arm 90 of this construction will be accompanied by the bracket 186 in order to obtain the desired close fit between the idler arm anchor end 180 and its pivotal mounting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an automobile steering linkage, an idler arm having anchor and relay ends adapted for pivotal attachment respectively to an automobile chassis and to an automobile steering linkage, one of said idler arm ends having therein a generally cylindrical bore open at one end and closed at its other end by an end wall, a ball seat member loosely received in said bore and having on its outer face a ball seat, said member having a side wall which is entirely spaced from and has a lateral clearance with the side wall of said bore for lateral uncentered movement therein and for movement through said bore open end, a pin having a ball head loosely received in and spaced from the wall of said bore and pivotally engaged in said ball seat and having a shank extending through said open end and adapted for attachment to one of said chassis and steering linkage, said bore end wall and the inner face of said ball seat member having flat planar engaging surfaces each spaced from the side wall of said bore, additional complementary surfaces on said member and on said idler arm within said bore, said additional surfaces being engaged and disposed between said planar surfaces and the member and bore side walls and laterally orienting said member and its ball seat in said bore in a fixed relation therein whereby to obtain a precision orientation of said seat in said bore regardless of irregularities in the dimensions of said member and bore thereby eliminating the necessity for precision machining of the dimension and location of said bore while obtaining a precision location of said ball seat, means engaging said idler arm and retaining said ball head against said ball seat.

2. The combination of claim 1 wherein said end wall planar surface is substantially perpendicular to the axis of said bore.

3. The combination of claim 1 wherein said retaining means includes a closure covering said bore open end and secured within said bore at said open end.

4. The combination of claim 1 wherein said bore additional surface is conical and inclined thereto and extends towards said bore side wall.

5. The combination of claim 1 wherein said member comprises an annular body with a central opening therethrough said ball seat comprising a cavity recessed in the outer face of said member and intersected by said central opening.

6. The combination of claim 5 including lubricating openings in said ball seat, means supplying lubricant into said ball seat.

7. The combination of claim 1 wherein said end wall is imperforate, a fluid tight closure for said bore open end and through which said shank extends.

8. The combination of claim 1 wherein said retaining means includes resilient means surrounding said shank and confined within said bore and yieldingly urging said ball head upon said ball seat.

9. The combination of claim 1 wherein said retaining means includes a closure for the open end of said bore, a bushing slidably received on said shank and movably confined within said bore, said bushing having a laterally projecting flange, a spring surrounding said shank and bushing with one end of said spring abutting said flange, said flange and the other end of said spring engaging said ball head and said closure.

10. The combination of claim 9 wherein said flange and ball head have annular planar engaging surfaces.

11. The combination of claim 10 wherein said flange has lubricant grooves upon its face which is opposite that engaged by said spring.

References Cited by the Examiner
UNITED STATES PATENTS

| | | | |
|---|---|---|---|
| 2,274,420 | 2/42 | Katcher | 287—90 |
| 2,635,906 | 4/53 | Graham et al. | 287—90 |
| 2,718,418 | 9/55 | Latzen | 287—90 |
| 2,910,316 | 10/59 | Dier | 287—90 |
| 3,005,647 | 10/61 | Collier | 287—90 |
| 3,028,172 | 4/62 | Herbenar | 280—95 |
| 3,041,094 | 6/62 | Herbenar | 287—87 |
| 3,044,798 | 7/62 | Gerner | 280—95 |
| 3,053,556 | 9/62 | Klocke et al. | 287—93 X |
| 3,073,634 | 1/63 | Gottschald | 287—90 |

FOREIGN PATENTS 532,569   8/55   Italy.

A. HARRY LEVY, *Primary Examiner.*

PHILIP ARNOLD, *Examiner.*